United States Patent
Compton et al.

(10) Patent No.: US 10,613,946 B2
(45) Date of Patent: Apr. 7, 2020

(54) DEVICE RESERVATION MANAGEMENT FOR OVERCOMING COMMUNICATION PATH DISRUPTIONS

(71) Applicant: International Business Machines Corporation, Armonk, NY (US)

(72) Inventors: Scott B. Compton, Hyde Park, NY (US); Matthew R. Craig, Sahuarita, AZ (US); Clint A. Hardy, Tucson, AZ (US); Tri M. Hoang, Poughkeepsie, NY (US); Matthew J. Kalos, Tucson, AZ (US); John G. Thompson, Tucson, AZ (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/828,288

(22) Filed: Nov. 30, 2017

(65) Prior Publication Data

US 2019/0163576 A1    May 30, 2019

(51) Int. Cl.
  *G06F 11/14* (2006.01)
  *G06F 3/06* (2006.01)
  *H04L 29/08* (2006.01)

(52) U.S. Cl.
  CPC ......... *G06F 11/1464* (2013.01); *G06F 3/065* (2013.01); *G06F 11/1469* (2013.01); *H04L 67/1095* (2013.01); *H04L 67/1097* (2013.01)

(58) Field of Classification Search
  CPC ............. G06F 11/1464; G06F 11/1469; G06F 11/2071; G06F 11/2069; G06F 11/2082;
  (Continued)

(56) References Cited

U.S. PATENT DOCUMENTS 6,304,980 B1 * 10/2001 Beardsley ........... G06F 11/2064
                                                        707/999.202
6,446,176 B1    9/2002 West et al.
(Continued)

FOREIGN PATENT DOCUMENTS

| EP | 2299361 | 3/2011 |
| WO | 2008020310 | 2/2008 |
| WO | 2016098150 | 6/2016 |

OTHER PUBLICATIONS

S. Das, et al., "Storage Management for SAP and Oracle: Split Mirror Backup / Recovery With IBM's Enterprise Storage Server (ESS)", International Business Machines Corporation, Total 70 pages.

(Continued)

*Primary Examiner* — Nadeem Iqbal
(74) *Attorney, Agent, or Firm* — William K. Konrad; Konrad, Raynes, Davda and Victor LLP

(57) ABSTRACT

One general aspect of device reservation management in accordance with the present description, is directed to a host issuing I/O data requests to a primary device which synchronously mirrors data to a secondary data storage device wherein both devices are reserved for exclusive use by the host for I/O data requests. In response to a loss of communication connectivity on all paths to the primary storage controller controlling the primary device, the host confirms whether a communication path to the primary device has been established and whether the primary device remains reserved to the host. Upon successful confirmations, the reservation of the primary device is repaired such that I/O data requests to the reserved primary device continue. Other features and aspects may be realized, depending upon the particular application.

18 Claims, 6 Drawing Sheets

(58) Field of Classification Search
CPC .. G06F 11/2007; G06F 11/2033; G06F 3/067; G06F 3/061; G06F 3/0647
See application file for complete search history.

(56) References Cited

U.S. PATENT DOCUMENTS

| | | | | |
|---|---|---|---|---|
| 7,225,307 | B2* | 5/2007 | Micka | G06F 11/2058 711/161 |
| 7,350,114 | B2* | 3/2008 | Moody, II | G06F 11/1443 714/43 |
| 7,647,525 | B2 | 1/2010 | Lecrone et al. | |
| 7,882,316 | B2* | 2/2011 | Boyd | G06F 11/2064 711/162 |
| 7,979,396 | B1 | 7/2011 | Krishnamurthy et al. | |
| 8,335,899 | B1* | 12/2012 | Meiri | G06F 11/2076 711/162 |
| 8,341,364 | B2 | 12/2012 | Coronado et al. | |
| 8,694,828 | B2 | 4/2014 | Nelson et al. | |
| 8,782,358 | B2 | 7/2014 | Broido et al. | |
| 8,819,362 | B1 | 8/2014 | Duprey et al. | |
| 8,949,183 | B2 | 2/2015 | Hildebrand et al. | |
| 9,483,204 | B2 | 11/2016 | Schnapp et al. | |
| 10,282,258 | B1 | 5/2019 | Compton et al. | |
| 2004/0205312 | A1 | 10/2004 | Zlotnick et al. | |
| 2004/0254964 | A1 | 12/2004 | Kodama et al. | |
| 2005/0038968 | A1 | 2/2005 | Iwamura et al. | |
| 2005/0071708 | A1 | 3/2005 | Bartfai et al. | |
| 2005/0273647 | A1 | 12/2005 | Furuumi et al. | |
| 2006/0005074 | A1 | 1/2006 | Yanai et al. | |
| 2006/0020753 | A1 | 1/2006 | Cochran et al. | |
| 2007/0079062 | A1 | 4/2007 | Miyawaki et al. | |
| 2009/0063892 | A1 | 3/2009 | Abdulvahid et al. | |
| 2013/0086349 | A1 | 4/2013 | Kaiya et al. | |
| 2015/0135003 | A1* | 5/2015 | Cota-Robles | G06F 11/1666 714/6.3 |
| 2015/0350318 | A1 | 12/2015 | Van Assche et al. | |
| 2019/0163373 | A1 | 5/2019 | Compton et al. | |
| 2019/0220370 | A1 | 7/2019 | Compton et al. | |

OTHER PUBLICATIONS

U.S. Appl. No. 15/828,288 (18.746), filed Nov. 30, 2017, invented by Scott B. Compton et al., Total 40 pages.

U.S. Appl. No. 15/828,302 (18.747), filed Nov. 30, 2017, invented by Scott B. Compton et al., Total 56 pages.

Lists of Related Applications, for U.S. Appl. No. 15/828,288 (18.719) pp. 2, dated Dec. 1, 2017.

Office Action, dated Dec. 19, 2018, for U.S. Appl. No. 15/828,302, (18.746), filed Nov. 30, 2017, invented by Scott B. Compton et al., Total 15 pages.

Response to Office Action, dated Mar. 19, 2019, for U.S. Appl. No. 15/828,302, (18.746), filed Nov. 30, 2017, invented by Scott B. Compton et al., Total 14 pages.

Notice of Allowance, dated May 15, 2019, for U.S. Appl. No. 15/828,302, (18.746), filed Nov. 30, 2017, invented by Scott B. Compton et al., Total 7 pages.

Notice of Allowance, dated Dec. 26, 2018, for U.S. Appl. No. 15/828,311 (18.747), invented by Scott B. Compton et al., Total 12 pages.

US Patent Application, dated Mar. 26, 2019, for U.S. Appl. No. 16/365,621 (18.747C1), filed Mar. 26, 2019, invented by Scott B. Compton et al., Total 68 pages.

Preliminary Amendment, dated Mar. 26, 2019, for U.S. Appl. No. 16/365,621 (18.747C1), filed Mar. 26, 2019, invented by Scott B. Compton et al., Total 16 pages.

Notice of Allowance, dated Aug. 21, 2019, for U.S. Appl. No. 15/828,302, (18.746), filed Nov. 30, 2017, invented by Scott B. Compton et al., Total 8 pages.

* cited by examiner

DEVICE RESERVATION MANAGEMENT FOR OVERCOMING COMMUNICATION PATH DISRUPTIONS

BACKGROUND OF THE INVENTION

1. Field of the Invention

The present invention relates to a computer program product, system, and method for device reservation management for overcoming communication path disruptions between a host and a data storage device.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Thus, data from a host to be stored in the data storage system is typically directed to a primary data storage device such as a volume at a local site and then replicated to one or more secondary data storage devices which may be geographically remote system from the primary data storage device. One primary device can have multiple secondary relationships in which data directed to a primary device is replicated to multiple secondary devices.

The process of replicating, that is, copying data over to the secondary device can be setup in either a synchronous or asynchronous relationship between the primary and the secondary device. In a synchronous relationship, any updates to the primary device are typically synchronized with the secondary device, that is, successfully copied over to the secondary device, before the primary storage controller controlling the primary device reports to the host that the data storage input/output operation has been successfully completed. Thus, in a synchronous mode, an I/O operation which performed a write operation to the primary device is not considered complete until the mirror operation is completed, that is, it is not complete until the update data has been successfully replicated to the secondary device. Should the mirror operation fail such that the update is not successfully mirrored to the secondary storage, the host may be notified that the update operation was not successfully completed.

Storage systems may alternatively employ an asynchronous relationship between a primary device and a secondary device, particularly if the secondary device is geographically distant from the primary device. In an asynchronous relationship, successful updates to the primary device are typically reported to the host as a successful storage input/output operation without waiting for the update to be replicated to the secondary device. As a result, the host need not wait for the data replication to the secondary device to be completed, and the performance of the host system may be enhanced accordingly.

As the name suggests, in an asynchronous relationship, the data of the primary device and the secondary device may not be fully synchronized at any one time. Thus, data stored on the secondary device typically lags that stored in the primary device. Accordingly, new data stored on a primary device may not be stored on the secondary device for an interval of time such as 3-5 seconds, for example.

Selected primary devices such as a volume or logical unit (LUN), may be reserved for exclusive use by a particular host for I/O data requests. Such reservation of a device for exclusive use of the reservation holding host is often referred to as "hardware serialization." Although secondary devices typically are not reserved directly, one or more secondary devices may be in effect be reserved by association with the reservation of a primary device held by the host.

Failures may occur not only in a reserved device or the storage controller controlling the device, but may also occur in a data communication path through the network from the host to the primary data storage system which has the reserved device. Typically, a number of redundant communication paths are provided by the network between a host and a primary data storage system having a device reserved to that host. The reservation is typically identified by a particular path group identification (ID) which has been established for a group of communication paths from the reserving host to the storage controller holding the reservation on behalf of the host.

A host may learn of a failure in a data communication path in connection with an attempted input/output operation by the host which is directed to a device reserved to that host. If the input/output operation is directed to the reserved device along a path that had failed and has been re-established, the storage controller holding the reservation on behalf of the host, typically informs the reserving host that communication connectivity had been lost on that communication path. Such a notification is often referred to as a "reset event."

For example, when a fiber optic communication path of the network is dropped and physically reestablished (referred to as loss and reestablishment, respectively, of "light"), the storage controller logically reestablishes the logical communication path so that it is logically operational. When the host operating system attempts an I/O operation down this logically reestablished communication path, the storage controller which controls the reserved device presents a reset event to the host to let the host operating system know that light was dropped. This is a signal to the host operating system that it should perform any revalidation of the logically reestablished communication path such as revalidating the logically reestablished communication path for host-initiated I/O operations. Such revalidation may include confirming that the host still retains the reservation of the device reserved before the reset event. For example, in an IBM (International Business Machines Corporation) system, the host may issue a SNID (Sense Path Group ID) command to the storage controller to confirm that the device is still reserved to that host in connection with the path that caused the reset event.

The loss or reset of any single communication path or subset of communication paths of the group of communication paths identified by the path group identification (ID), typically did not cause the storage controller to release of the device reservation of the path group ID. However, when the last communication path of the path group ID is lost or reset, such that no communication path of that path group ID is currently established with communication connectivity between the reserving host and the storage controller, in prior data storage systems, the device reservation previously was lost, that is released by the storage controller.

Thus, previously in prior data storage systems, if all communication paths of a group path ID between the host and its reserved device failed or otherwise malfunctioned such that the storage controller lost all communication connectivity via the communication paths of the path group ID, the storage controller released the reservation of the device of the path group ID such that it was no longer reserved for the exclusive use of the host which held the reservation prior to loss of all communication via the communication paths of the path group ID. Such a release of the reservation occurred even if the loss of all communication connectivity along the paths of the path group ID was just temporary.

In response to loss of a reservation of a device, the host typically disabled use of the device by the host because data serialization may have become compromised because the host no longer had exclusive access to the device. In the context of a z/OS operating system for a host, a host disabling a device previously reserved to that host is typically referred to as "boxing" the device. Depending on the importance of this device, an application may fail, or in some instances, the system may fail.

A mirrored pair of primary and secondary devices may be managed by primary-secondary role swap logic such that if a failure occurs in connection with the device, a device role swap can be performed, averting the need to report the error to the I/O requestor. Instead, the host may redirect the I/O request to the secondary device. This swap technique, when employed by the z/OS operating system, is referred to as "HyperSwap."

It is appreciated herein that device disablement may cause performance loss as well as unintended system failures. In storage systems in which a swap capability such as HyperSwap is in use, reservation of storage devices by a host typically was not permitted. However, it has been proposed that in a swap situation, the secondary data storage system assuming the role of a primary data storage system, may honor a reservation of a primary device of the original primary data storage system by reserving the secondary device of the relationship.

SUMMARY

One general aspect of device reservation management for overcoming communication path disruptions in accordance with the present description, is directed to issuing by input/output (I/O) request logic of a host, I/O data requests to a primary device which is in a synchronous mirroring relationship with at least one secondary device. In addition, the primary device is reserved for exclusive use by the host for I/O data requests wherein the reservation of the primary device is extended to each secondary device of the mirroring relationship. Also, the primary and secondary data storage devices are managed by primary-secondary role swap logic of the host to provide for selective swapping of primary and secondary roles of the primary and secondary data storage devices. Still further, monitor logic of the host, may receive in response to a particular I/O data request to the primary device, a notification that a communication path to the primary device had been disrupted.

In one aspect of device reservation management in accordance with the present description, device reservation management logic of the host confirms in response to a loss of communication connectivity on all communication paths from the host to the storage controller controlling the reserved primary device and in response to reestablishment of at least one communication path from the host to the storage controller controlling the reserved primary device, whether the primary device remains reserved for exclusive use by the host for I/O data requests. Upon successful confirmation that at least the primary device remains reserved to the host, I/O request logic of the host, issues I/O data requests to the primary device instead of issuing the I/O data request to a secondary device of the mirroring relationship.

As a result, the I/O data request may be completed by the originally reserved primary device, obviating potential performance degradation and component or system failures which might have been caused if the originally reserved primary device had been disabled or a primary-secondary role swap undertaken. Instead, utilizing device reservation management in accordance with one aspect of the present description, the reservation of the primary device, may be repaired following loss of communication connectivity on all paths for the reserved primary device, so that the I/O data requests may be completed by the originally reserved primary device.

In another aspect, the device reservation management logic of the host also confirms that a communication path from the host to each secondary device of the mirror relationship is established and that all the secondary devices remain reserved for exclusive use by the host for I/O data requests.

In yet another aspect, upon failure to confirm at least one of a communication path from the host to the primary device is established or that the primary device no longer remains reserved for exclusive use by the host for I/O data requests, the device reservation management logic of the host disables the primary data device with respect to the host. By comparison, upon successful confirmation that at least one of a communication path from the host to the primary device is established and that at least the primary device remains reserved to the host, disablement of the primary device following notification that a communication path to the primary device had been disrupted, is bypassed wherein the primary storage device remains enabled with respect to the host despite the notification. Still further, upon successful confirmation that all the primary and secondary devices remain reserved to the host, swapping of roles of the primary device and the secondary data storage device is also bypassed, wherein the primary and secondary roles of the primary and secondary data storage devices remain unchanged despite the notification.

In still another aspect, confirming by the device reservation management logic of the host that the primary device remains reserved for exclusive use by the host for I/O data requests includes causing I/O request logic to issue an I/O request requesting confirmation of the reservation of the primary device. Implementations of the described techniques may include hardware, a method or process, or computer software on a computer-accessible medium. Other features and aspects may be realized, depending upon the particular application.

DETAILED DESCRIPTION

Figure 1:
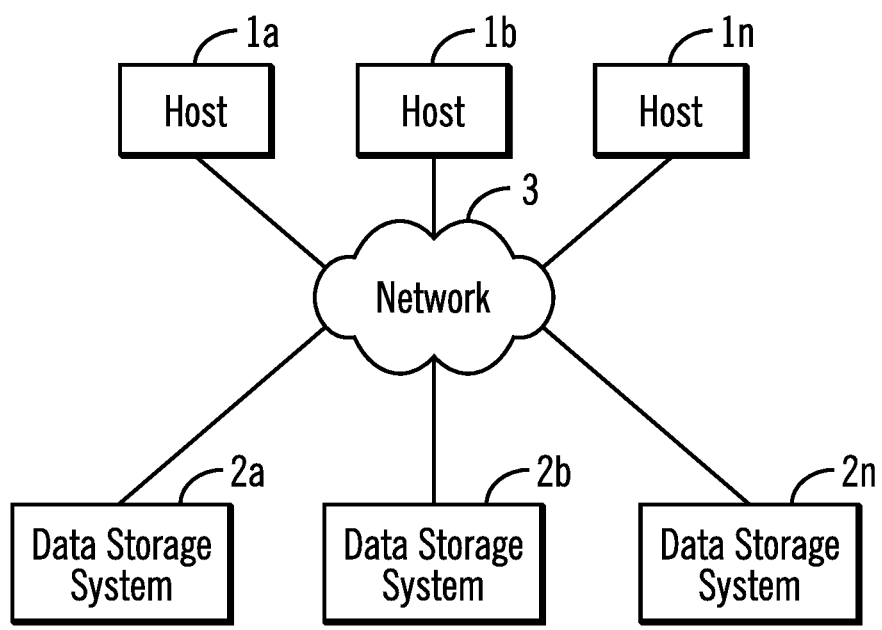
FIG. 1 illustrates an embodiment of a computing environment employing device reservation management for overcoming communication path disruptions in accordance with one aspect of the present description.

It is appreciated herein that prior to device reservation management in accordance with the present description, a disruption of all communication paths between a host and a storage controller controlling a device reserved to that particular host typically caused loss of the device reservation. As a result, the host typically disabled the device, which could cause performance loss as well as system failures. However, as described in copending application Ser. No. 15/828,311, entitled "Data Reservation State Preservation In Data Mirroring", and Ser. No. 15/828,302, entitled "Device Reservation State Synchronization in Data Mirroring", a capability of maintaining the reservation of a primary device notwithstanding disruption of all communication paths between the reserved device and the host which owned the reservation prior to the communication path disruptions, has been developed.

Since one primary device can have multiple secondary relationships, the reservation of a primary device can be extended by propagation to all secondary devices of a synchronous mirror relationship as described in copending application Ser. No. 15/828,311, entitled "Data Reservation State Preservation In Data Mirroring". Such reservations of the secondary devices of a synchronous mirror relationship may be maintained as well notwithstanding a loss of all communication paths between the reserving host and the primary storage controller controlling the primary device.

In one aspect of device reservation management in accordance with the present description, loss of all communication connectivity between the reservation holding host and the storage controller controlling the reserved primary device need not result in the host disabling the reserved device nor initiating a primary-secondary role swap. Instead, device reservation management in accordance with the present description permits the host to repair the host's reservation of the primary and secondary devices. As described in greater detail below, such repair includes reestablishing communication connectivity with the primary storage controller and confirming that the storage controller has maintained the reservation of the primary device instead of releasing the reservation due the loss of all communication connectivity with the reserving host. Successful repair of the reservation of the primary and secondary data storage devices can avoid disablement of the reserved device and can also avoid a primary-secondary role swap despite the host losing all communication connectivity over the paths to the storage controller controlling the reserved device. In this manner, performance losses and system failures due to device disablement or primary-secondary device role swaps may be reduced. Furthermore, loss of synchronous mirroring of data may be avoided.

In one embodiment, device reservation management logic, in response to monitor logic determining a loss of all communications paths, does not disable the reserved primary data storage device having the disrupted communication paths. Instead, the device reservation management logic of the host confirms, in response to a notification of loss, whether a communication path from the host to the primary data storage system controlling the reserved device is established and whether the primary device remains reserved by the data storage device for exclusive use by the host for I/O data requests.

For example, to confirm whether a communication path from the host to the primary data storage system controlling the reserved device is established and whether the primary device remains reserved for exclusive use by the host for I/O data requests, the device reservation management logic may cause I/O request logic to issue an I/O request to the primary data storage system requesting confirmation of the reservation of the primary device. If the primary data storage system is capable of maintaining the reservation notwithstanding a temporary failure of all communication paths between the reservation holding host and the particular data storage system, the primary data storage system can respond to the I/O request, confirming that that the reservation has been maintained. Thus, receipt by the host of confirmation of the continued reservation of the primary data storage device for the benefit of the host, can confirm both the establishment of a communication path to the primary data storage system and that the reservation of the primary data storage device has been maintained by the primary data storage system for the benefit of the host notwithstanding the disruption in communication paths between the reservation holding host and the primary data storage system controlling the device reserved by the host prior to the communication path disruption.

In one embodiment, issuance of an I/O data request by I/O request logic of the host following disruption and restoration of a communication path between the reservation holding host and the reserved primary data storage device, may trigger the reserved primary data storage system to respond to the I/O data request by sending a reset event type notification to the reservation holding host, informing the host of the earlier disruption of the communication path. Thus, in one embodiment, the device reservation management logic of the host, upon successful confirmation that a communication path has been established between the reservation holding host and that the primary data storage system controlling the reserved device, and that the primary and secondary devices of the mirror relationship remain reserved to the host, permits the I/O request logic of the host, to initiate or resume issuing I/O data requests to the primary data storage device. As a result, the I/O data requests may be completed by the originally reserved primary data storage device, obviating potential performance degradation and component or system failures which might have been caused if the originally reserved primary data storage device had been disabled and a primary-secondary role swap undertaken. Instead, utilizing device reservation management in accordance with one aspect of the present description, the reservation of the primary data storage device, may be repaired following a communication path disruption so that the I/O data requests may be completed by the originally reserved primary data storage device. Other aspects and advantages may be realized, depending upon the particular application.

A system of one or more computers may be configured for device reservation management in accordance with the present description, by virtue of having software, firmware, hardware, or a combination of them installed on the system that in operation causes or cause the system to perform device reservation management for overcoming communication path disruptions operations. For example, one or more computer programs may be configured to perform device reservation management by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

In the illustrated embodiment, a mirror relationship identifies a source storage location, such as a primary storage location, and a target storage location, such as a secondary storage location, in which data stored at the source storage location is to be replicated or otherwise copied to the target storage location. Thus, as used herein, a source storage location and a target storage location are storage locations related by a copy relationship.

Furthermore, as used herein, the term "device" in the context of a reservation, refers to a storage location containing one or more units of data storage such as one or more volumes, logical units (LUNs), cylinders, tracks, segments, extents, or any portion thereof, or other unit or units of data suitable for transfer or storage. Thus, a source device and the associated target device may each be a storage volume. However, it is appreciated that a source device and a target device may each be of a size other than a volume, for example. It is further appreciated that a device which may be reserved on behalf of a host may be a physical device or a virtual device. Implementations of the described techniques may include hardware, a method or process, or computer software on a computer-accessible medium.

FIG. 1 illustrates an embodiment of a computing environment employing device reservation management for overcoming communication path disruptions in accordance with the present description. A plurality of hosts 1a, 1b . . . 1n may submit Input/Output (I/O) requests to one or more data storage systems 2a, 2b, 2n over a network 3 to access data stored by the data storage systems. The hosts 1a, 1b . . . 1n may be separate physical devices or may be virtual devices implemented using assigned resources of partitions of a server, for example. In a similar manner, the data storage systems 2a, 2b . . . 2n may be separate physical devices or may be virtual devices implemented using assigned resources of partitions a server, for example.

Figure 2:
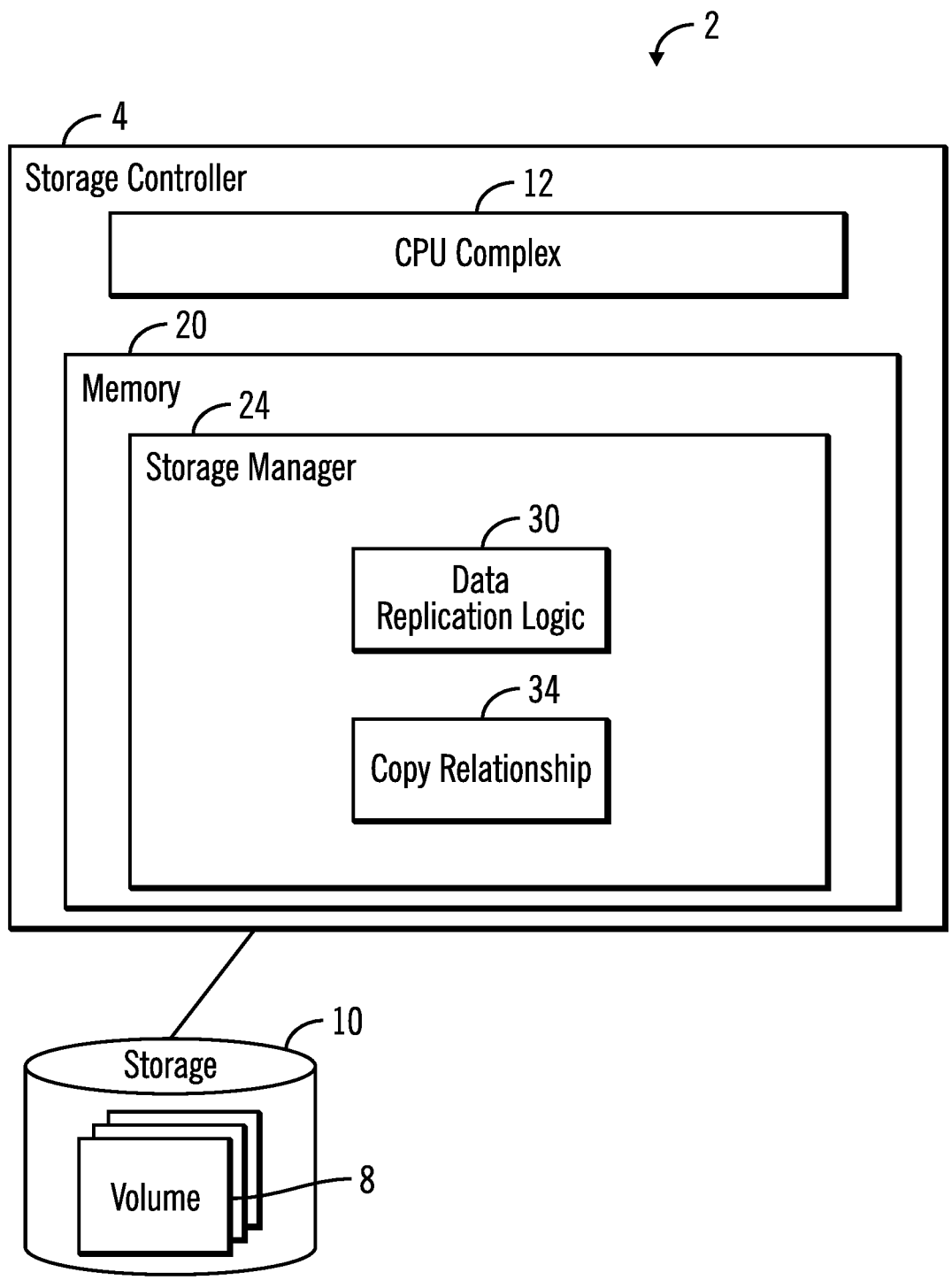
FIG. 2 illustrates an example of a data storage system for use with a host employing device reservation management in accordance with one aspect of the present description.
Figure 3:
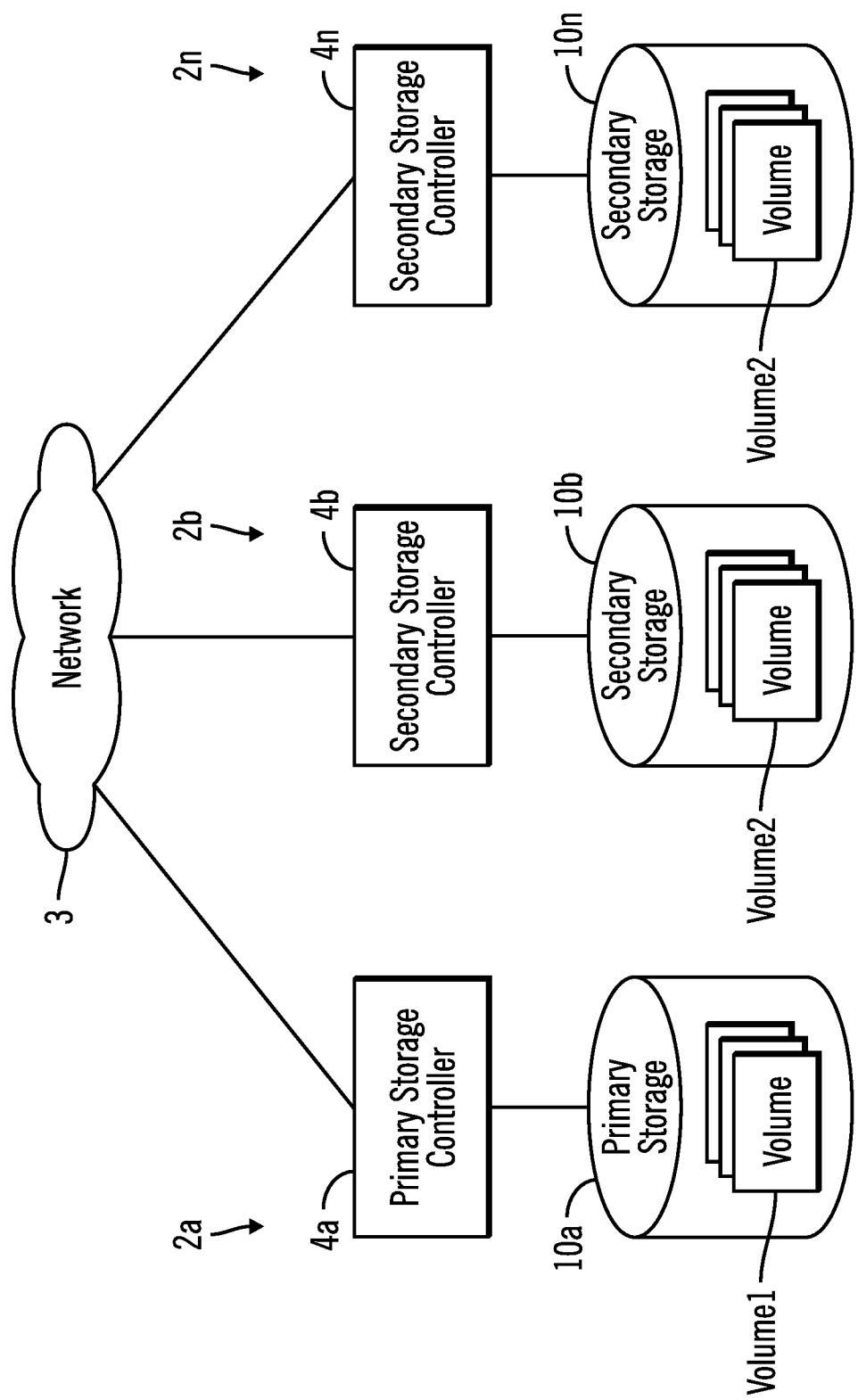
FIG. 3 illustrates an example of a storage system having a primary data storage system and one or more secondary data storage systems for use in a system employing device reservation management in accordance with one aspect of the present description.

FIG. 2 shows an example of a data storage system such as the system 2, for example, in greater detail. Thus, each data storage system 2 (FIG. 2), 2a, 2b . . . 2n (FIG. 1) includes a storage controller or control unit 4 (FIG. 2), 4a (FIG. 3), 4b, . . . 4n which accesses data at volumes 8 (e.g., Logical Unit Numbers, Logical Devices, Logical Subsystems, etc.) in storage represented by one or more storage drives 10, 10a, (FIG. 3), 10b, . . . 10n (FIG. 3). Each storage controller 4, 4a, 4b, . . . 4n includes a CPU complex 12 (FIG. 2), including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a (FIG. 3), 4b, . . . 4n further has a memory 20 that includes a storage manager 24 for managing storage operations including writing data to or reading data from an associated storage drive 10, 10a (FIG. 3), 10b, . . . 10n respectively, in response to an I/O data request from the host holding the reservation of a data storage device in a data storage system 2 (FIG. 2), 2a (FIG. 3), 2b, 2n. The storage operations managed by the storage manager 24 further include data replication operations from a primary device such as primary volume1 (FIG. 3) of a primary data storage system such as the data storage system 2a, for example, to a secondary device such as secondary volume2 at a secondary data storage system such as the data storage system 2b, for example. In this embodiment, there may be multiple secondary data storages such that a mirror relationship can be in a one to many relationship, which is also referred to as a multi-target relationship. There may also be in some relationships just a single secondary data storage such that a mirror relationship can be in a one to one relationship, which is also referred to herein as a single target relationship.

A data replication logic 30 (FIG. 2) of the storage manager 24 is configured to synchronously generate copies of the primary volume1 (FIG. 3) of the primary data storage system 2a as a secondary volume2 (FIG. 3) of each of the single target or multi-target secondary data storage systems 2b, 2n in a mirror relationship with the primary volume1. Thus, each primary-secondary pair of volumes, volume1, volume2 are in an synchronous mirror relationship 34 such that updates to the primary volume1 are synchronously mirrored to the secondary volume2 of each secondary device paired with the primary device, volume1.

In the illustrated embodiment, the storage manager 24 including the data replication logic 30, is depicted as software stored in the memory 20 and executed by the CPU complex 12. However, it is appreciated that the logic functions of the storage manager 24 may be implemented as hardware, software, firmware or combinations of one or more thereof, depending upon the particular application.

One or more copy relationships 34, which may be maintained by the data replication logic 30 for the primary controller 4a and secondary storage controllers 4b, 4n (FIG. 3) associate primary storage locations in the primary storage drive 10a and corresponding secondary storage locations in one or more of the secondary storage drives 10b, . . . 10n such that updates to the primary storage drive 10a locations are copied to each of the corresponding secondary storage locations of the storage drives 10b, . . . 10n locations. For example, source storage locations in a primary storage volume1 (FIG. 3) of storage drive 10a may be synchronously mirrored in a mirror data replication operation to target storage locations of a secondary volume2 of the storage drive 10b pursuant to a mirror copy relationship 34 (FIG. 2).

In the illustrated embodiment, a copy relationship 34 comprises a peer-to-peer synchronous mirror relationship for a primary-secondary pair of storage locations in which updates to the primary (source) storage locations of the mirror relationship 34 are synchronously mirrored to each of the secondary (target) storage locations of the single target or multi-target mirror relationship 34. It is appreciated that other types of copy relationships may be established, depending upon the particular application.

In the configuration illustrated in FIG. 3, the storage controller 4a and the data storage drive 10a have been configured as a primary storage control unit and the primary storage, respectively, of a primary data storage system 2a. Similarly, the storage controller 4b and its data storage drive 10b have been configured as a secondary storage control unit and a secondary storage, respectively, of a secondary data storage system 2b. Hence, in the configuration depicted in FIG. 3, the storage controller 4a will be referred to as a primary storage controller or control unit 4a, and the data storage drive 10a will be referred to as a primary storage drive 10a. Similarly, the storage controller or control unit 4b will be referred to as a secondary storage controller or control unit 4b and the data storage drive 10b will be referred to as a secondary data storage drive 10b.

As noted above, there may be multiple secondary data storages such that a mirror relationship can be in a one to many relationship, which is also referred to as a multi-target relationship. Thus, additional storage controllers as represented by the storage controller 4n are referred to herein as secondary storage controllers or control units 4n and the data storage drive 10n is referred to as a secondary data storage drive 10n. As used herein, a partner storage controller is a storage controller which controls a volume or device of a synchronous mirror relationship.

In a particular copy relationship, the source unit is often referred to as the primary and the target unit is often referred to as the secondary. Replication relationships are defined between storage units of the data storage drives 10a, 10b, . . . 10n. Notwithstanding a reference to the data storage drive 10a as "primary" and a data storage drive 10b, . . . 10n as "secondary," particular storage units of the data storage drive 10a and the storage drives 10b, . . . 10n may play both a primary (or source role) and a secondary (or target role) depending upon the particular copy relationship.

In data replication systems, data is typically maintained in volume pairs, comprising a primary volume in a primary storage system and a corresponding secondary volume in a secondary storage system that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary devices.

The primary storage controller 4a is located at a first site and the secondary storage controllers 4b, . . . 4n are located at other sites which may be geographically or functionally remote from the first site. Thus, in this example, the first site may be at a local site and the other site or sites may be at geographically remote sites separated by a short or long geographical distance from the local site and from each other. Alternatively, the local and remote sites may be relatively close such as in different buildings in the same general geographical location, in different rooms of the same building, in different machines in the same room, or in different portions or partitions of the same machine, of the network 3.

The storage manager 24 (FIG. 2) in one embodiment may transfer data from the primary storage drive 10a (FIG. 3) to the secondary storage drive 10b, . . . 10n in tracks. As used herein, the term track may refer to a track of a disk storage unit but may also reference to other units of data configured in the storage drive 10, 10a, 10b, such as a bit, byte, word, segment, page, block (such as a Logical Block Address (LBA)), etc., which may be a part of a larger grouping of data units, such as a volume, logical device, etc.

In one embodiment, the storage devices 10, 10a, 10b, . . . 10n may be comprised of one or more sequential access storage devices, such as hard disk drives and magnetic tape or may include non-sequential access storage devices such as solid state drives (SSD), for example. Each storage device 10, 10a, 10b, . . . 10n may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

One mode of the data replication logic 30 managing the copy relationships, may be implemented with synchronous copy operations, such as a peer-to-peer remote copy (PPRC) program modified as appropriate in accordance with present description. The described operations may be implemented with other programs such as other copy programs or other global recovery programs modified as appropriate in accordance with present description.

The system components 1a, 1b . . . 1n, 4, 4a, 4b, . . . 4n, 10, 10a, 10b, . . . 10n are connected to the network 3 which enables communication among these components. Thus, the network 3 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
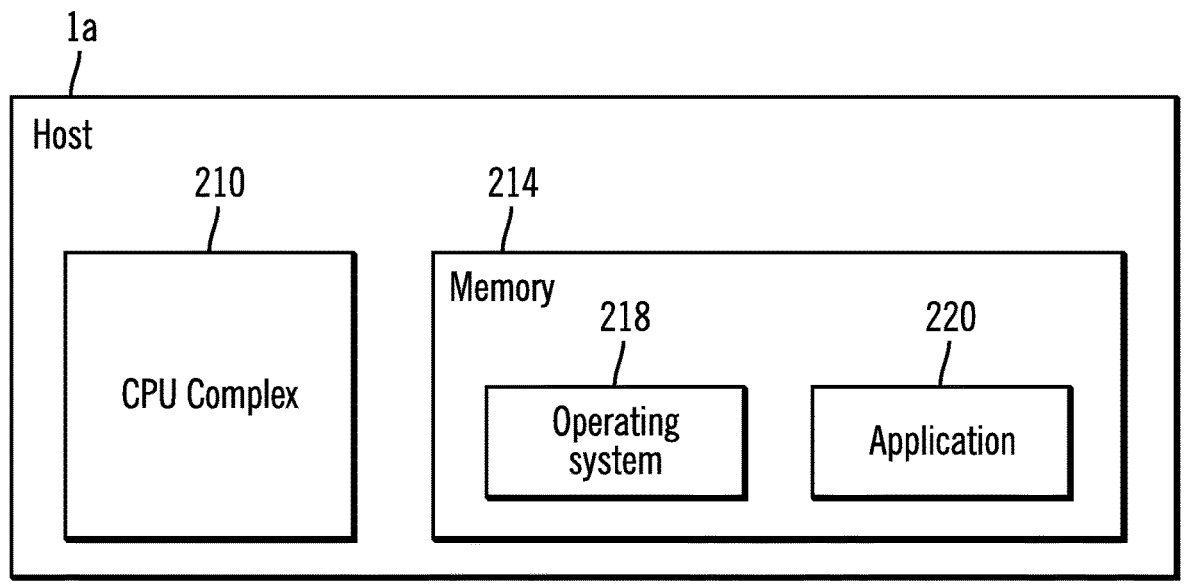
FIG. 4 illustrates an example of a host having one or more components modified to employ device reservation management in accordance with one aspect of the present description in the storage system of FIG. 1.

A typical host as represented by the host 1a of FIG. 4 includes a CPU complex 210 and a memory 214 having an operating system 218 and an application 220 that cooperate to read data from and write data updates to the primary storage drive 10a (FIG. 3) or secondary storage drive 10b, . . . 10n via a storage controller 4a, 4b, . . . 4n, respectively. An example of a suitable operating system is the z/OS operating system. It is appreciated that other types of operating systems may be employed, depending upon the particular application.

Figures 5A, 5B, 5C:
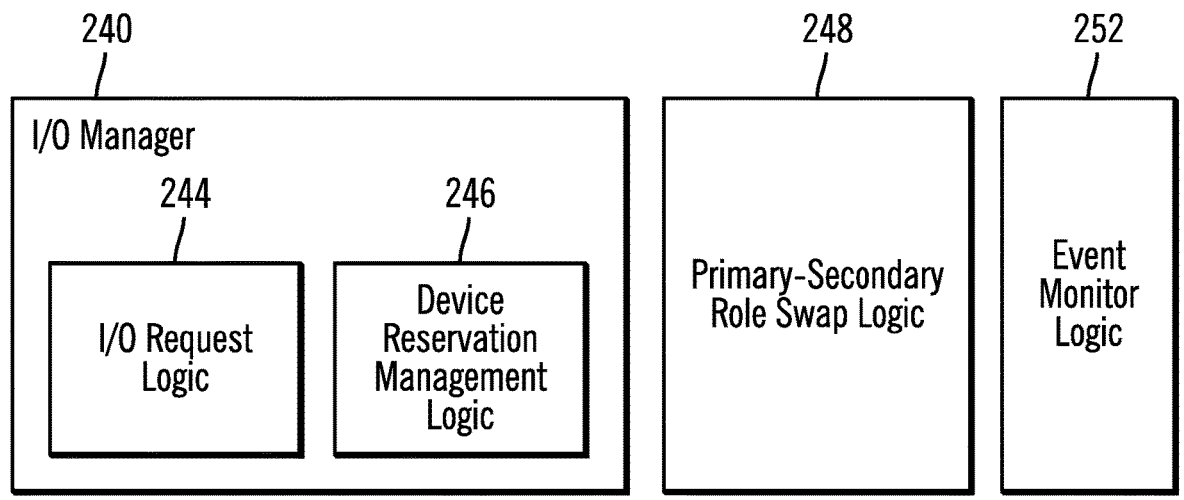
FIG. 5A illustrates an I/O manager for a host employing device reservation management in accordance with one aspect of the present description.
FIG. 5B illustrates a primary-secondary role logic for a host employing device reservation management in accordance with one aspect of the present description.
FIG. 5C illustrates event monitor logic for a host employing device reservation management in accordance with one aspect of the present description.

In the illustrated embodiment, each host such as the host 1a (FIG. 4) includes an input/output (I/O) manager 240 (FIG. 5A) which may be a part of the host operating system 218 or an application 220 (or both) modified to employ device reservation management for overcoming communication path disruptions, in accordance with the present description. Thus, in one embodiment, the I/O manager 240 is depicted as software stored in the memory 214 and executed by the CPU complex 210. However, it is appreciated that the logic functions of the I/O manager 240 may be implemented as hardware, software, firmware or combinations of one or more thereof, depending upon the particular application.

The I/O manager 240 includes I/O request logic 244 configured to issue in response to a read or write operation requested by an I/O requestor such as an application 220, an I/O data request to a storage controller 4a for a primary device, such as volume1 (FIG. 3), for example, to read data from the selected primary device, or write data to the selected primary device. The I/O manager 240 of the host 1a further includes device reservation management logic 246 configured to request reservation of selected primary devices for exclusive use by the host 1a for I/O data requests. Such reservation of a device for exclusive use of the reservation holding host is often referred to as "hardware serialization." The status of a particular device as reserved to a particular host, may be indicated by suitable data structures maintained by the reservation management logic 246 of the reservation holding host, and suitable data structures maintained by the storage controller controlling the devices reserved to a particular host.

In the illustrated embodiment, each host such as the host 1a (FIG. 4) further includes primary-secondary role swap logic 248 (FIG. 5B) which may be a part of the host operating system 218 or an application 220 (or both). Examples include a HyperSwap Manager in a z/OS HyperSwap and Geographically Dispersed Parallel Sysplex (GDPS). Thus, in one embodiment, primary-secondary role swap logic 248 is depicted as software stored in the memory 214 and executed by the CPU complex 210. However, it is appreciated that the logic functions of primary-secondary role swap logic 248 may be implemented as hardware, software, firmware or combinations of one or more thereof, depending upon the particular application.

A primary-secondary role swap logic 248 of the host is configured to selectively swap primary and secondary roles of the primary and secondary data storage systems, respectively in the event such a swap is needed to maintain data replication operations. For example, if monitor logic 252 (FIG. 5c) of the host 240 determines that the primary data storage system 2a (FIG. 3) of a primary-secondary pair of data storage systems 2a, 2b of a mirroring relationship, has been lost to the host 1a due to a hardware or software failure of the primary data storage system 2a, for example, the primary-secondary role swap logic 248 of the host is configured to selectively swap primary and secondary roles of the data storage systems 2a, 2b so that the data storage system 2b which was originally the secondary data storage system, is re-assigned the role of the primary data storage system of the pair of data storage systems 2a, 2b. In addition, the roles of the primary and secondary devices, volume1 and volume2, respectively, of a mirror relationship may be swapped as well.

More specifically, if data of the data storage system 2a (FIG. 3) is being synchronously mirrored (using, for example, peer to peer remote copy, (PPRC)), the data storage system 2a is considered a primary data storage system and can have one or more partner secondary data storage systems such as the data storage systems 2b, 2n. The synchronously mirrored device pair of volume1 and volume2, for example, of the primary and secondary data storage systems 2a, 2b, for example, are managed by the primary-secondary role swap logic 248 which can if appropriate, selectively perform a swap operation, which is referred to as "HyperSwap" when employed by the z/OS operating system. Accordingly, if a failure occurs to the primary data storage system 2a, a device role swap can be selectively performed by the primary-secondary role swap logic 248. The swap can obviate reporting an error to the I/O requestor. Instead, the host can re-issue the I/O data request to the secondary data storage system 2b upon successfully reassigning the data storage system 2b as the primary data storage system. In such a swap of roles, the primary and secondary roles of the devices controlled by the storage controllers of the swapped systems, may be swapped as well. Thus, the primary and secondary roles of the devices volume1 and volume2, for example, may be swapped as well.

Failures may not only occur in a primary data storage system, but may alternatively occur in a data path through the network 3 from the host to the primary data storage system which includes a reserved primary device. Typically, a number of redundant communication paths are provided by the network 3 between a host and a primary data storage system having a device reserved to that host. Such a failure in a data communication path may be detected in connection with an attempted input/output operation by the host which is directed to a device reserved to that host. The reservation is typically identified by a particular path group identification (ID) which has been established for a group of communication paths from the reserving host to the storage controller holding the reservation. If the input/output is directed to the reserved device along a failed or reset communication path of the path group ID, device reservation logic of the storage controller holding the reservation on behalf of the host, is configured to inform the reserving host when communication connectivity has been lost on that communication path. Such a notification is often referred to as a "reset event." The monitor logic 252 (FIG. 5C) is configured to receive such a notification that a communication path to a reserved device of the primary data storage system has been disrupted. As used herein, a communication path is considered to have communication connectivity if communication over the communication path is both operational and has been logically validated by the host for I/O operations. Thus, a communication path having communication connectivity with a reserving host is a communication path that has not been lost nor is in a state of having been reset and awaiting revalidation by the host for I/O operations to be initiated or resumed along that path.

For example, when a fiber optic communication path of the network 3 (FIG. 1) is dropped and physically reestablished (referred to as loss and reestablishment, respectively, of "light"), the storage controller logically reestablishes the logical communication path so that is logically operational. When the host operating system 218 (FIG. 4) attempts an I/O operation down this logically reestablished communication path, the storage controller controlling the reserved device presents a reset event to the event monitor logic (FIG. 5C) of the host to let the host operating system 218 know that light was dropped. This is a signal to the host operating system 218 that it should perform any revalidation of the logically reestablished communication path such as revalidating the logically reestablished communication path for host-initiated I/O operations.

The loss or reset of any single communication path of the group of communication paths identified by the path group identification (ID), typically did not cause a loss or release of the device reservation of the path group ID. However, when the last communication path of the path group ID is lost or reset, such that no communication path of that path group ID is currently established with communication connectivity between the reserving host and the storage controller, in prior data storage systems, the device reservation previously was lost, that is released by the storage controller.

Thus, previously in prior data storage systems, if all communication paths of a group path ID between the host and its reserved device failed or otherwise malfunctioned such that the storage controller lost all communication connectivity via the communication paths of the path group ID, the storage controller released the reservation of the device of the path group ID such that it was no longer reserved for the exclusive use of the host which held the reservation prior to loss of all communication via the communication paths of the path group ID. Such a release of the reservation occurred even if the loss of all communication connectivity along the paths of the path group ID was just temporary.

In response to receipt of a reset event, a host may confirm whether or not it still retains reservation of a device which was reserved prior to the reset event. Such confirmation may be performed by the host issuing a suitable command to the storage controller for the reserved device, such as an SNID command, for example, in an z/OS operating system environment. Upon confirming that a device reservation has been released by the storage controller, the host typically disabled use of the primary data storage device by the host because serialization had been lost, that is, the primary data storage device was no longer reserved to that host. In the context of a z/OS operating system for a host, a host disabling a device previously reserved to that host is typically referred to as "boxing" the device. Depending upon the importance of the device, disabling a primary data storage device may cause an application running on the host to fail, or in some instances, the host or the data storage system as a whole may fail.

It is appreciated herein that in the event of a host disabling (boxing) a primary device due to loss of the host's reservation of that device, primary-secondary role swap logic of the host might be configured to swap primary-secondary roles such that the secondary data storage device was reassigned the primary role. If so, subsequent I/O requests would be directed to the new primary (originally secondary) data storage device instead of to the original primary data storage device. While such a swap action potentially may avert failure of an application or a system, it is recognized herein that the resultant swap may have other effects which may be undesirable such as an increase in latency due to performing I/O operations to an alternate and perhaps more distance site at which the new primary (originally secondary) data storage device is located.

In addition, it is recognized herein that the swapping of primary and secondary roles may itself have associated risks. For example, if any errors occur during the execution of the swap operation, not only the system directly involved may fail, but also associated systems in a cluster or sysplex may fail as well. Furthermore, initiation of a swap results in at least temporary loss of the synchronous mirroring of data from one device to another device until the swap is completed and mirroring is restored. Moreover, in some systems, another swap operation may not be initiated until the failing conditions which caused the initial swap operation are resolved and mirroring is restored. As a result, there may be increased risk of data loss in the event of another hardware or software failure before completion of the initial swap operation.

Accordingly, prior to device reservation management in accordance with the present description, a loss of all communication connectivity between a reserving host and the storage controller controlling a reserved, typically resulted in disablement of the reserved device and which could cause performance loss as well as system failures depending upon circumstances. However as described in copending application Ser. No. 15/828,311, entitled "Data Reservation State Preservation In Data Mirroring", and Ser. No. 15/828,302, entitled "Device Reservation State Synchronization in Data Mirroring", a capability has been developed to maintain the status of a device as reserved to a particular host notwithstanding a disruption in all communication paths between the device and the host which owned the reservation prior to the communication path disruptions.

In one aspect of device reservation management in accordance with the present description, a loss of communication connectivity on all communication paths between a reserving host a reserved device need not result in either disablement of the reserved device nor a primary-secondary role swap. Instead, device reservation management in accordance with the present description facilitates repair of the reservation of the primary data storage device. As described in greater detail below, such repair includes in one aspect, reestablishing communication connectivity with the storage controller and confirming that the storage controller has maintained the reservation instead of releasing the reservation due the loss of all communication connectivity with the reserving host. In other aspects, repair may also include confirming that each of the secondary storage controllers has maintained the reservation of the secondary devices of the mirroring relationship.

Successful repair of the reservation of the primary data storage device can avoid disablement of the reserved device and can avoid a primary-secondary role swap despite the host losing all communication connectivity over the communication paths to the storage controller controlling the reserved device. In this manner, performance losses and system failures due to data storage device disablement or primary-secondary device role swaps may be reduced. Furthermore, loss of the synchronous mirroring of data until mirroring is restored, may be avoided.

In one embodiment, the monitor logic 252 (FIG. 5c) is configured to determine when the last communication path of the path group ID of a device reservation is lost or reset, such that no communication path of that path group ID is currently established with communication connectivity between the reserving host and the storage controller controlling the reserved device. The device reservation management logic 246 of the host is configured to, in response to the monitor logic 252 (FIG. 5C) determining that all communication connectivity has been lost, to not disable the reserved primary device having the disrupted communication paths. Instead, the device reservation management logic 246 of the host is configured to, in response to the monitor logic 252 (FIG. 5C) determining that all communication connectivity has been lost, confirm whether a communication path from the host to the primary data storage device has been reestablished and also confirm whether the primary data storage device remains reserved for exclusive use by the host for I/O data requests.

For example, to confirm whether a communication path from the host to the primary data storage device is reestablished and to confirm that the primary data storage device remains reserved for exclusive use by the host for I/O data requests, the device reservation management logic 246 of the host may be further configured to cause the I/O request logic 244 to issue an I/O status request to the primary data storage device requesting confirmation of the continuance of the reservation of the primary data storage device. Such confirmation may be performed by the host issuing a suitable command to the storage controller for the reserved device, such as a SNID command, for example, in an z/OS operating system environment. If the primary data storage system is capable of maintaining the reservation notwithstanding a failure of all communication paths between the reservation holding host and the storage controller controlling the particular reserved device, the storage controller for the reserved device can respond to the I/O request by confirming that the reservation has been maintained. Thus, receipt by the host of confirmation of the continued status of reservation of the primary device by the host, can confirm both the establishment of a communication path to the storage controller controlling the primary device, as well as confirm that the reservation of the primary device has been maintained by the primary data storage system notwithstanding the disruption in communication paths between the reservation holding host and the primary data storage system of the primary device reserved by the host prior to the communication path disruption. Confirmation that each secondary device of the mirror relationship may be performed in a similar manner.

As previously mentioned, in one embodiment, issuance of an I/O data request by the I/O request logic 244 following disruption of a communication path between the reservation holding host and the primary storage controller controlling the reserved primary device, may trigger the storage controller controlling the reserved primary device to respond to the I/O data request by sending a reset event type notification to the reservation holding host, informing the host of the disruption of the communication path. In one embodiment, the device reservation management logic 246 is configured to, in response to a reset event notification, confirm that communication connectivity has been re-established on the communication path identified by the reset event notification. As noted above, in one embodiment, a communication path is considered to have communication connectivity if communication over the communication path is both operational and has been logically validated by the host for I/O operations. Thus in one embodiment, the device reservation management logic 246 is configured to, in response to a reset event notification, validate the communication path that was reset as being operational. In one embodiment, such validation by a host of a reset communication path may further include the host confirming that the primary device reserved to the host prior to the reset event, remains reserved to the host in the manner described above. Thus, in one embodiment, such confirmation of reservation status of the primary device may occur in response to each reset notification. In another embodiment, the device reservation management logic 246 may be configured to defer confirming the reservation status until it is determined that a reset event notification has been received for all communication paths of the path group ID for the reserved device.

In this manner, the device reservation management logic 246 is configured to repair a device reservation in response to a loss of all communication connectivity with the storage controller controlling a reserved device, by, in one aspect, validating at least one communication path to the storage controller as having restored communication connectivity and by confirming that the reservation of the device has been maintained by the storage controller instead of being released. The reservations of each of the secondary devices of the synchronous mirror relationship may be repaired in a similar manner. Thus, the device reservation management logic is further configured to, for each secondary device of the synchronous mirror relationship, validate at least one communication path to the secondary storage controller for the secondary device and confirm that the reservation of the secondary device has been maintained by the secondary storage controller instead of being released.

In one embodiment, the device reservation management logic 246 of the host may be further configured to, upon successful repair of the reservations of the primary and secondary devices of the synchronous mirror relationship, cause the I/O request logic 244 of the host, to initiate or resume issuing I/O data requests to the primary data storage device. As a result, the I/O data request may be completed by the originally reserved primary data storage device, obviating potential performance degradation and component or system failures which might have been caused if the originally reserved primary data storage device had been disabled or a primary-secondary role swap undertaken. Instead, utilizing device reservation management in accordance with one aspect of the present description, the reservation of the primary and secondary devices may be repaired following a loss of communication connectivity on all communication paths so that the I/O data request may be completed by the originally reserved primary data storage device.

Figure 6:
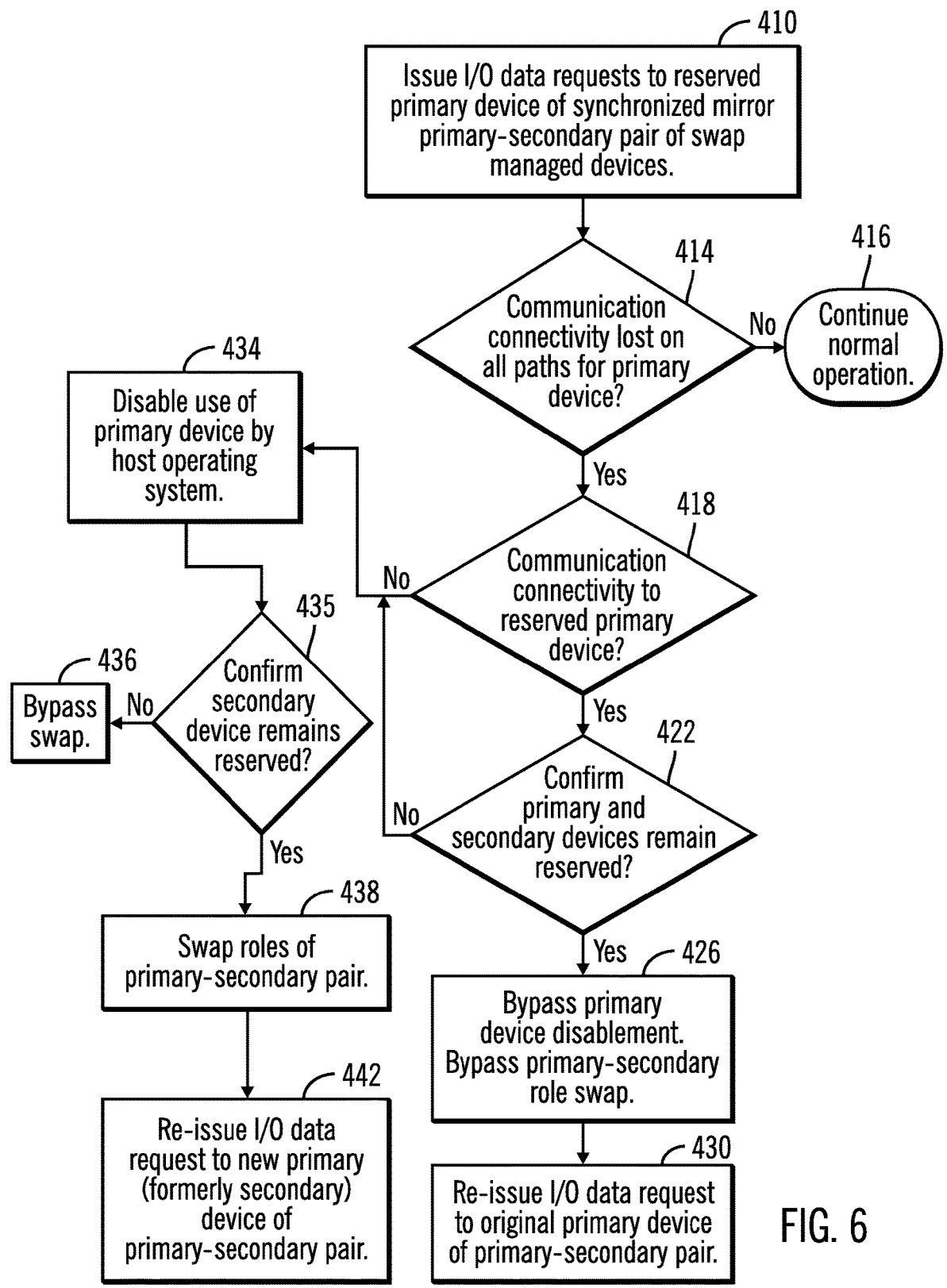
FIG. 6 depicts an example of operations of an I/O manager for a host employing device reservation management in accordance with one aspect of the present description.

FIG. 6 shows one embodiment of operations of an I/O manager 240 employing device reservation management in accordance with one aspect of the present description. In one operation, and referring generally to FIGS. 4-6, the I/O request logic 244 (FIG. 5) issues (block 410, FIG. 6) in response to a read or write operation requested by an I/O requestor such as an application 220 (FIG. 4), an I/O data request to a storage controller 4a (FIG. 3) of a primary data storage system 2a, for example, to read data from a selected primary device such as volume1 (FIG. 3), for example, or write data to a selected primary device which has been reserved for exclusive use of the host 1a (FIG. 4). In this embodiment, data is synchronously mirrored (using, for example, peer to peer remote copy, (PPRC)), from the primary device volume1 (FIG. 3) of the primary data storage system 2a to each of the secondary devices, volume2 (FIG. 3), of one or more secondary data storage systems 2b, 2n of a single target or multi-target mirror relationship. Each secondary device (volume2, for example) of the synchronous mirror relationship has been indirectly reserved on behalf of the host 1a by propagation of the reservation of the primary device to the secondary devices of the synchronous mirror relationship in the manner described in copending application Ser. No. 15/828,311, entitled "Data Reservation State Preservation In Data Mirroring". The primary-secondary pair volume1, volume2, of each pair of the mirror relationship is managed by the primary-secondary role swap logic 248 such that should a failure occur to the primary data storage system 2a, a device role swap can be selectively performed by the primary-secondary role swap logic 248. However, as described below, device reservation management in accordance with the present description can reduce the occurrence of device disablement and swap operations, thereby improving system performance and reliability.

A determination (block 414, FIG. 6) is made as to whether communication connectivity has been lost for all communication paths associated with the reservation of the primary device. In one embodiment, a determination is made as to whether communication connectivity has been lost for all communication paths of the path group ID associated with the reservation of the primary device volume1. As noted above, a number of redundant communication paths are typically provided between a host and a storage controller controlling a primary device reserved to that host. If a communication path between the host and its reserved device fails and is subsequently reestablished, when the reserving host attempts to issue an I/O operation along the reestablished communication path, the storage controller for the reserved primary device typically notifies the reservation holding host of the disruption of that communication path in the form of a "reset event". If a communication path between the host and its reserved device fails and is not subsequently reestablished, and the reserving host attempts to issue an I/O operation along the failed communication path, the attempt fails.

In this embodiment, the monitor logic 252 (FIG. 5C) is configured to determine (block 414, FIG. 6) in response to one or more failures or reset event notifications whether communication connectivity has been lost for all communication paths of the path group ID for the reservation of the primary device volume1. If not, normal operations continue (block 416). Conversely, in one aspect of device reservation management in accordance with the present description, disablement of the reserved device and a primary-secondary role swap may each be bypassed notwithstanding a determination (block 414) that communication connectivity has been lost for all communication paths between the reserving host and the storage controller controlling the reserved primary device. Instead, device reservation management in accordance with the present description facilitates repair of the reservations of the primary and secondary devices of the mirror relationship.

Accordingly, in one embodiment, the monitor logic 252 (FIG. 5C) of the host, is configured to, in response to determining (block 414, FIG. 6) a loss of all communication paths of the primary device reservation, confirm (block 418, FIG. 6) whether a communication path from the host to the storage controller controlling the reserved primary device is established (or reestablished). If so, device reservation management logic 246 is configured to confirm whether (block 422) all the reserved devices of the mirror relationship remain reserved for exclusive use by the host for I/O data requests.

For example, the monitor logic 252 (FIG. 5C) in response to determining (block 414, FIG. 6) a loss of all communication paths of the primary device reservation, confirms (block 418, FIG. 6) whether a communication path from the host to the storage controller controlling the primary device is established (or reestablished). If so, the device reservation management logic 246 confirms whether (block 422) the primary device remains reserved for exclusive use by the host for I/O data requests. In one embodiment, to confirm whether a communication path from the host to the primary data storage device is established and whether the primary data storage device remains reserved for exclusive use by the host for I/O data requests, the device reservation management logic 246 of the host may cause the I/O request logic 244 to issue an I/O request to the primary data storage device requesting confirmation of the reservation of the primary data storage device. Receipt of confirmation of the reservation of the primary data storage device, can confirm both the establishment of a communication path to the primary data storage system and that the reservation of the primary device has been maintained by the primary data storage system notwithstanding the prior disruption in all communication paths between the reservation holding host and the primary data storage system which has the primary device reserved by the host prior to the communication path disruption. It is appreciated the confirmations (blocks 418, 422) may be accomplished by other suitable techniques, depending upon the particular application.

In some embodiments, in addition to confirming (block 418, FIG. 6) that a communication path from the host to the primary data storage device is established and confirming (block 422) that the primary data storage device remains reserved for exclusive use by the host for I/O data requests, the device reservation management logic 246 may also be configured to confirm (block 418, FIG. 6) that a communication path is established between the reservation holding host and each reserved secondary data storage device of a single target or multi-target mirror relationship, and that both the primary device and the secondary device or devices of the single target or multi-target mirror relationship remain reserved (block 422) to the host in a manner similar to that described above in connection with the primary device.

Thus, in one embodiment, the secondary data storage system may be capable of maintaining a propagated reservation obtained indirectly on behalf of a host as described in copending application Ser. No. 15/828,311, entitled "Data Reservation State Preservation In Data Mirroring", and Ser.

No. 15/828,302, entitled "Device Reservation State Synchronization in Data Mirroring", notwithstanding a disruption in communication paths from the reservation holding host to one or more of the reserved devices of the mirror relationship, in a manner similar to that described above in connection with the reserved primary device. Confirmation of the reservation status of each secondary device of the mirror relationship may be useful, for example, to ensure that data mirroring may continue and that the capability remains for the primary-secondary role swap logic of the host to selectively swap primary and secondary roles of the primary and secondary data storage devices, respectively, should such a swap be selected in the event of a failure within the primary data storage system itself. However, as noted above, a swap due to a temporary communication path disruption may be avoided by reservation management in accordance with the present description.

As noted above, there may be multiple secondary devices in a multi-target synchronous mirror relationship such that a mirror relationship can be a one primary device to many secondary devices relationship. Accordingly, in a multi-target relationship, a determination (block 422) is made as to whether the reservations of all of the secondary devices of a multi-target relationship have been maintained as well as the primary reservation of the primary device of the mirror relationship. In some embodiments, a determination (block 422) may be made as to whether a communication path to each secondary storage controller of each secondary device of the multi-target mirror relationship remains established or has been re-established.

Upon successful confirmation (block 422) that both the primary device and all the secondary devices of the mirror relationship remain reserved for exclusive use by the host for I/O data requests, the reservations of the devices of the mirror relationship have been repaired following loss (block 414, FIG. 6) of communication connectivity on all paths to the storage controller of the primary device. As a result, disablement of the reserved primary device and initiation of a primary-secondary role swap may be bypassed (block 426, FIG. 6) notwithstanding an earlier loss (block 414, FIG. 6) of communication connectivity on all paths to the storage controller of the primary device. Instead, upon successful confirmation that the primary and secondary devices remain reserved to the host, the device reservation management logic 246 of the host causes the I/O request logic 244 of the host, to issue or re-issue (block 430, FIG. 6) I/O data requests to the original primary device. Thus, instead of transmitting the I/O data requests to a secondary device following a swap, the I/O data requests are transmitted to the original reserved primary device. Accordingly, the primary and secondary roles of the primary and secondary devices remain unchanged despite loss of communication connectivity on all communication paths from the host to the primary storage controller controlling the reserved primary device.

Accordingly, as a result of the confirmations, I/O data requests may be completed by the originally reserved primary device, obviating potential performance degradation and component or system failures which might have been caused if the originally reserved primary device had been disabled and a primary-secondary role swap undertaken. Instead, utilizing device reservation management in accordance with one aspect of the present description, the reservations of the primary and secondary devices, may be repaired following a communication path disruption so that the I/O data requests may be completed by the originally reserved primary device.

Successful repair of the reservation of the primary data storage device can avoid disablement of the reserved device and a primary-secondary role swap despite the host receiving notification of disruption of communication paths to the reserved data storage device. In this manner, performance losses and system failures due to data storage device disablement and primary-secondary device role swaps may be reduced.

However, in the event that the device reservation management logic 246 of the host fails to confirm (block 418, FIG. 6) that a communication path from the host to the reserved primary device is established, or fails to confirm (block 422) that both the primary device and all secondary devices of the mirror relationship remain reserved for exclusive use by the host for I/O data requests, the primary data storage device reserved to the host is disabled (block 434) on the host operating system.

The device reservation management logic 246 is further configured to confirm (block 435) whether a reservation of a secondary device of the synchronous mirror relationship has been maintained. If not, a role swap is bypassed, that is, not attempted (block 436). Conversely, if it is confirmed (block 435) that a reservation of a secondary device of the synchronous mirror relationship has been maintained, in one embodiment, it may be assumed that the reservation of the primary device has also been maintained, notwithstanding that communication connectivity has not been restored on any communication path from the reserving host to the primary device of the mirror relationship. Accordingly, the role of the primary data storage device may be swapped (block 438) to that secondary device so that the secondary device assumes the role of the disabled primary device. In some embodiments, prior to attempting to swap (block 438) the role of the primary data storage device to the secondary data storage device, the device reservation management logic 246 may also be configured to confirm that a communication path remains established between the reservation holding host and the reserved secondary device as well as that the secondary data storage device remains reserved to the host.

Upon successful completion of the swap (block 438) of the role of the primary device to the reserved secondary device, the device reservation management logic 246 may also be configured to cause the I/O request logic 244 of the host, to issue (block 442, FIG. 6) the I/O data requests to the new primary (formerly secondary) data storage system such as the system 2*b*, for example, instead of to the original primary data storage system 2*a*. As a result, the I/O data requests may be completed by the reserved secondary (and now primary) device of the secondary (and now primary) data storage system 2*b*.

Figure 7:
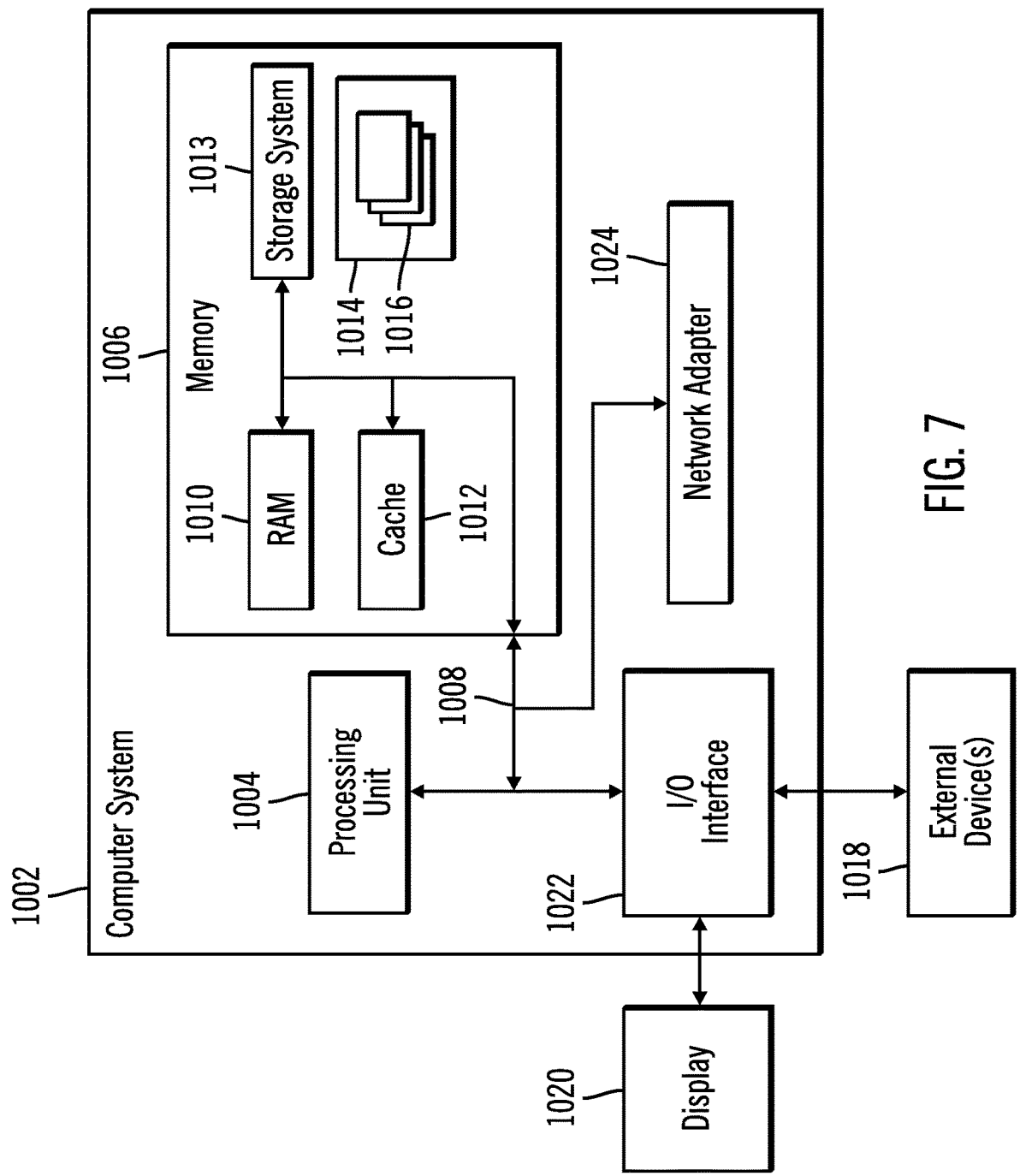
FIG. 7 illustrates a computer embodiment employing device reservation management for overcoming communication path disruptions in accordance with the present description.

The computational components of the figures may each be implemented in one or more computer systems, such as the computer system 1002 shown in FIG. 7. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with a host and a primary data storage system having a primary storage controller and a primary device controlled by the primary storage controller and configured to store data, and at least one secondary data storage system having a secondary storage controller and a secondary device controlled by the secondary storage controller and configured to store data, wherein the computer program product comprises a computer readable storage medium having program instructions embodied therewith, the program instructions executable by a processor of a host to cause processor operations, the processor operations comprising:

issuing by input/output (I/O) request logic of a host, I/O data requests to a primary device which is in a synchronous mirroring relationship with at least one secondary device wherein the primary device is reserved for exclusive use by the host for I/O data requests, wherein the reservation of the primary device is extended to the at least one secondary device of the mirroring relationship and the primary and secondary devices of the mirroring relationship are managed by primary-secondary role swap logic of the host to provide for selective swapping of primary and secondary roles of the primary and secondary devices, respectively;

in response to a loss of communication connectivity on all communication paths from the host to the primary storage controller controlling the reserved primary device and reestablishment of at least one communication path from the host to the primary storage controller controlling the reserved primary device, confirming by device reservation management logic of the host whether the primary device remains reserved for exclusive use by the host for I/O data requests; and upon successful confirmation that the primary device remains reserved to the host, issuing by the I/O request logic of the host, an I/O data request to the primary device instead of issuing the I/O data request to a secondary device of the mirroring relationship.

2. The computer program product of claim 1 wherein the operations further comprise confirming by the device reservation management logic of the host that the at least one secondary device of the mirroring relationship remains reserved for exclusive use by the host for I/O data requests; and wherein the issuing of the I/O data request further includes, upon successful confirmation that all the primary and secondary devices of the mirroring relationship remain reserved to the host, issuing by the I/O request logic of the host, I/O data requests to the primary device instead of issuing I/O data requests to a secondary device of the mirroring relationship.

3. The computer program product of claim 2 wherein the operations further comprise upon successful confirmation that all the primary and secondary devices of the mirroring relationship remain reserved to the host, bypassing by device reservation management logic of the host, disablement of the primary device wherein the primary device remains enabled with respect to the host despite loss of communication connectivity on all communication paths from the host to the primary storage controller controlling the reserved primary device.

4. The computer program product of claim 2 wherein the operations further comprise upon successful confirmation that all the primary and secondary devices of the mirroring relationship remain reserved to the host, bypassing by the primary-secondary role swap logic, the swapping of roles of the primary and secondary devices wherein the primary and secondary roles of the primary and secondary devices remain unchanged despite loss of communication connectivity on all communication paths from the host to the primary storage controller controlling the reserved primary device.

5. The computer program product of claim 1 wherein the confirming by the device reservation management logic of the host that the primary device remains reserved for exclusive use by the host for I/O data requests includes causing the I/O request logic to issue an I/O request requesting confirmation of the reservation of the primary device.

6. The computer program product of claim 1 wherein the operations further comprise the I/O request logic issuing an I/O data request to the primary device along a communication path and monitor logic of the host receiving a notification that the communication path to the primary storage controller controlling the primary device had been disrupted.

7. An apparatus for a host in a data storage system comprising a host and a primary data storage system having a primary storage controller and a primary device controlled by the primary storage controller and configured to store data, and at least one secondary data storage system having a secondary storage controller and a secondary device controlled by the secondary storage controller and configured to store data, comprising:

input/output (I/O) request logic of a host, configured to issue I/O data requests to a primary device which is in a synchronous mirroring relationship with at least one secondary device, wherein the primary device is reserved for exclusive use by the host for I/O data requests, wherein the reservation of the primary device is extended to the at least one secondary device of the mirroring relationship;

primary-secondary role swap logic of the host configured to manage the primary and secondary devices of the mirroring relationship for selective swapping of primary and secondary roles of the primary and secondary devices, respectively; and device reservation management logic of the host configured to, in response to a loss of communication connectivity on all communication paths from the host to the primary storage controller controlling the reserved primary device and in response to reestablishment of at least one communication path from the host to the primary storage controller controlling the reserved primary device, confirm whether the primary device remains reserved for exclusive use by the host for I/O data requests; and wherein the I/O request logic is further configured to, upon successful confirmation that the primary device remains reserved to the host, issue an I/O data request to the primary device instead of issuing the I/O data request to a secondary device of the mirroring relationship.

8. The apparatus of claim 7 wherein the device reservation management logic of the host is further configured to confirm the at least one secondary device of the mirroring relationship remains reserved for exclusive use by the host for I/O data requests to confirm that all the primary and secondary devices of the mirroring relationship remain reserved to the host; and wherein the I/O request logic is further configured to, upon successful confirmation that all the primary and all secondary devices of the mirroring relationship remain reserved to the host, issue I/O data requests to the primary device instead of issuing the I/O data requests to a secondary device of the mirroring relationship.

9. The apparatus of claim 8 wherein the device reservation management logic is further configured to, upon successful confirmation that all the primary and secondary devices of the mirroring relationship remain reserved to the host, bypass disablement of the primary device wherein the primary device remains enabled with respect to the host despite loss of communication connectivity on all communication paths from the host to the primary storage controller controlling the reserved primary device.

10. The apparatus of claim 8 wherein the primary-secondary role swap logic is further configured to, upon successful confirmation that all the primary and secondary devices of the mirroring relationship remain reserved to the host, bypass swapping of roles of the primary and secondary devices wherein the primary and secondary roles of the primary and secondary devices remain unchanged despite loss of communication connectivity on all communication paths from the host to the primary storage controller controlling the reserved primary device.

11. The apparatus of claim 7 wherein the device reservation management logic in confirming that the primary device remains reserved for exclusive use by the host for I/O data requests, is further configured to cause the I/O request logic to issue an I/O request requesting confirmation of the reservation of the primary device.

12. The apparatus of claim 7 wherein monitor logic of the host is configured to, in response to the I/O request logic issuing an I/O data request to the primary device along a disrupted communication path, to receive a notification that the communication path to the primary storage controller controlling the primary device had been disrupted.

13. A method, comprising:
issuing by input/output (I/O) request logic of a host, I/O data requests to a primary device which is in a synchronous mirroring relationship with at least one secondary device wherein the primary device is reserved for exclusive use by the host for I/O data requests, wherein the reservation of the primary device is extended to the at least one secondary device of the mirroring relationship and the primary and secondary devices of the mirroring relationship are managed by primary-secondary role swap logic of the host to provide for selective swapping of primary and secondary roles of the primary and secondary devices, respectively;
in response to a loss of communication connectivity on all communication paths from the host to the primary storage controller controlling the reserved primary device and reestablishment of at least one communication path from the host to the primary storage controller controlling the reserved primary device, confirming by device reservation management logic of the host whether the primary device remains reserved for exclusive use by the host for I/O data requests; and
upon successful confirmation that the primary device remains reserved to the host, issuing by the I/O request logic of the host, an I/O data request to the primary device instead of issuing the I/O data request to a secondary device of the mirroring relationship.

14. The method of claim 13 wherein, further comprising:
confirming by the device reservation management logic of the host that the at least one secondary device of the mirroring relationship remains reserved for exclusive use by the host for I/O data requests to confirm that all the primary and secondary devices of the mirroring relationship remain reserved to the host; and
wherein the issuing of the I/O data request further includes, upon successful confirmation that all the primary and secondary devices of the mirroring relationship remain reserved to the host, issuing by the I/O request logic of the host, I/O data requests to the primary device instead of issuing I/O data requests to a secondary device of the mirroring relationship.

15. The method of claim 14 further comprising upon successful confirmation that all the primary and secondary devices of the mirroring relationship remain reserved to the host, bypassing by the device reservation management logic, disablement of the primary device wherein the primary device remains enabled with respect to the host despite loss of communication connectivity on all communication paths from the host to the primary storage controller controlling the reserved primary device.

16. The method of claim 14 further comprising upon successful confirmation that all the primary and secondary devices of the mirroring relationship remain reserved to the host, bypassing by the primary-secondary role swap logic, the swapping of roles of the primary and secondary devices wherein the primary and secondary roles of the primary and secondary devices remain unchanged despite loss of communication connectivity on all communication paths from the host to the primary storage controller controlling the reserved primary device.

17. The method of claim 13 wherein the confirming by the device reservation management logic of the host that the primary device remains reserved for exclusive use by the host for I/O data requests includes causing the I/O request logic to issue an I/O request requesting confirmation of the reservation of the primary device.

18. The method of claim 13 further comprising in response to the I/O request logic issuing an I/O data request to the primary device along a disrupted communication path, receiving by monitor logic of the host a notification that the communication path to the primary storage controller controlling the primary device had been disrupted.

* * * * *